Nov. 13, 1956  L. W. HURLBUT  2,770,087
HARVESTING MACHINE FOR ROW CROP STALKS
Filed Nov. 23, 1954  4 Sheets-Sheet 4
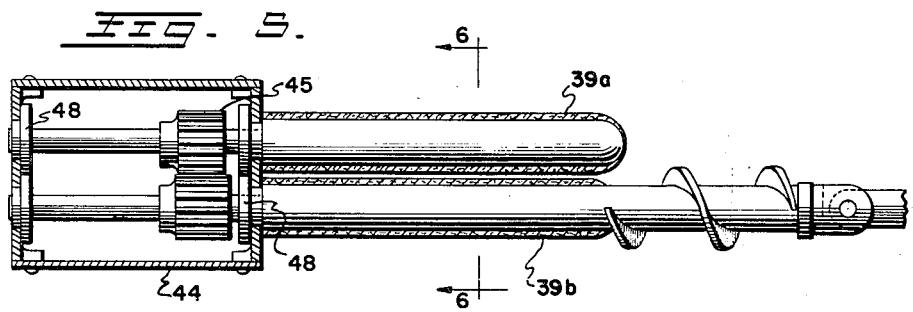
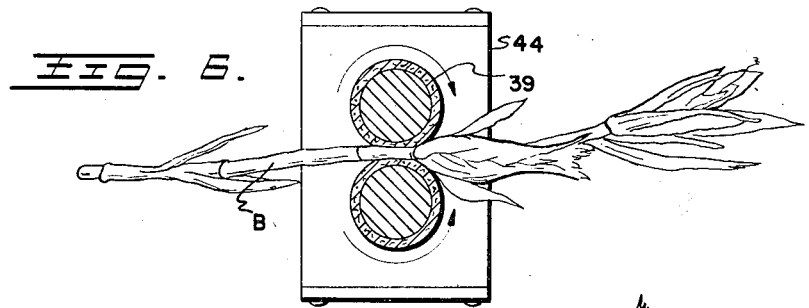
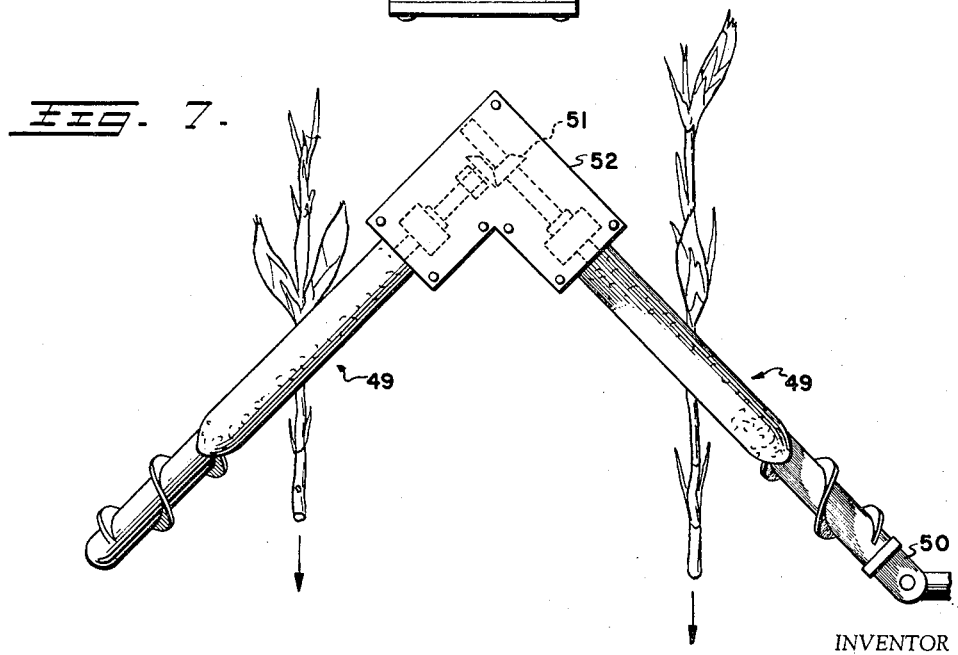
INVENTOR
LLOYD W. HURLBUT
BY Harold T. Stowell
ATTORNEY United States Patent Office 2,770,087
Patented Nov. 13, 1956

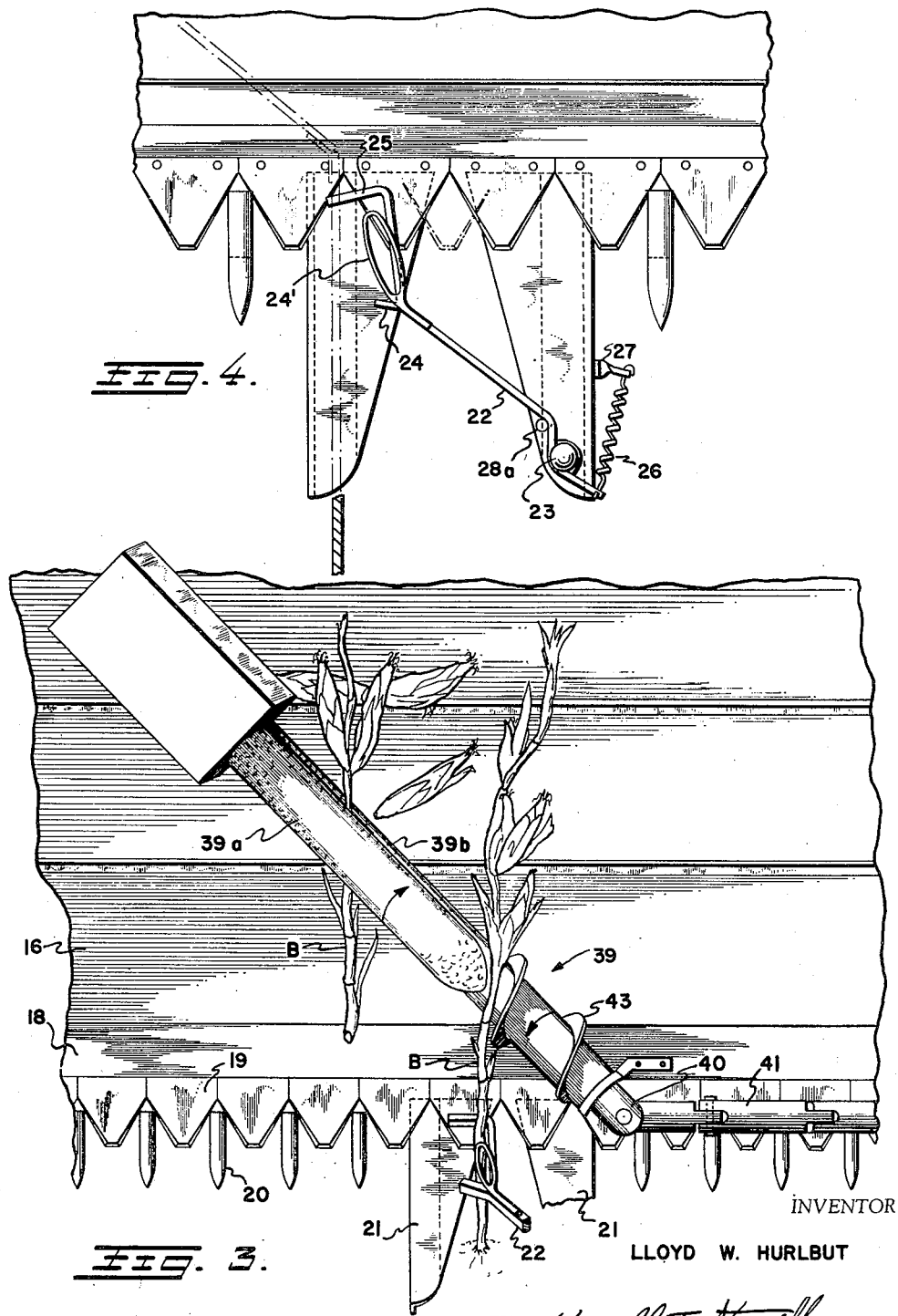

2,770,087

HARVESTING MACHINE FOR ROW CROP STALKS

Lloyd W. Hurlbut, Lincoln, Nebr., assignor to Research Corporation, New York, N. Y., a corporation of New York Application November 23, 1954, Serial No. 470,717

6 Claims. (Cl. 56—66)

This invention relates to a harvesting apparatus and more particularly and specifically to a harvesting apparatus that can be moved along a row of a standing crop to remove the seed producing section of the plant from the crop stalks in the row.

The invention herein disclosed is illustrated and described in the form for harvesting ears of corn for purposes of illustration, but the construction and functions of the elements embodied in the present invention are not intended to be limited only to harvesting of corn since they are readily adaptable to some of the other crops.

It is, therefore, a general object of the present invention to provide a harvesting apparatus to harvest from crops growing in rows the seeds thereon by squeezing the seed from the stalk with a pair of parallel cooperative rolls.

It is a principal object of the present invention to provide a harvesting apparatus which is adaptable for use in harvesting either a single row or multiple rows of a crop for the purpose of harvesting the seed therefrom.

A further object of the present invention lies in the provision of a harvesting apparatus which includes a positive acting gathering means positioned in advance of the parallel cooperative harvesting rolls and positioned to move in the direction of the row so that said gathering means operates to grasp and guide incoming stalks into the parallel cooperative rolls.

Still further, the present invention provides means associated with the gathering means of the apparatus for bringing bent or broken crop stalks into a substantially upright position for proper entry into the parallel co-operating rolls of the apparatus.

Yet another object of the instant invention is the provision of harvesting apparatus of the type generally described which includes means associated with the crop gathering means of the apparatus for severing the crop stalks closely adjacent to the ground or any desired distance above the ground and subsequently moving them into the rolls.

A further object is to provide such a device including a spring-loaded arm adjacent the cutting apparatus to restrict the forward, rearward or vertical movement of the severed ends of the stalks.

Still another object of the present invention is the provision of a harvesting apparatus which includes parallel cooperative rolls arranged in pairs, each pair of which is positioned at an angle to one unit of the gathering means and to the direction of the incoming row of crop entering said gathering means, whereby the stalks when severed are moved angularly away from the direction of the incoming row while the seed producing section of the crop is simultaneously removed therefrom by the squeezing action of the adjacent rolls or by the action of a related cutting or stripping unit.

A still further object is to provide harvesting rolls arranged in cooperatively associated pairs which will initially grasp the lower portion of incoming crop stalks and will move the stalks when severed, in an angular downward direction simultaneously with a lateral movement thereof away from the line of the incoming row of the crop so as to harvest the seed from the stalks and to discharge the same onto a suitable conveyor or other gathering means, and which rolls will then discharge the remaining stalks downwardly and forwardly of the apparatus in the direction of travel and to one side of the incoming row of crop.

It is still another object of the instant invention to provide harvesting rolls arranged either in single pairs for use with a single row of crop or in associated pairs for use with parallel and adjacent rows of standing crop. It is also an object in providing associated pairs of harvesting rolls with adjacent row pairs having a common journal and drive construction.

Yet another object of the instant invention lies in the provision of parallel cooperative rolls positioned above a seed gathering means such as a conveyor in such a manner so that all seed crop removed by the rolls is properly and efficiently directed onto the gathering means so as to avoid waste and loss in the harvesting operation.

Still another object is the provision and arrangement for driving the harvesting apparatus in such a manner so that the drive speed of the gathering means and the harvesting rolls are properly synchronized with one another and with the forward speed of the carriage for the apparatus so as to provide proper and efficient operation of the entire unit.

Still further, it is an object of this invention to provide a construction wherein the gathering means and the harvesting rolls are mounted so as to be adjustable relative to one another and to the carriage for the harvesting apparatus so as to permit regulation of their related positions to meet the requirement of the particular crop to be harvested.

Still a further object is to provide harvesting apparatus for seed crop of the type described which is not only adaptable for manufacture as a new apparatus in its entirety, but also one which is readily adaptable to manufacture as an attachment for present harvesting vehicles and equipment.

It is still another object of the instant invention to provide harvesting apparatus for corn or other crops which is of simple and inexpensive design and construction and which is durable and long-lasting in use.

These and other objects are accomplished by the parts, arrangements and combinations comprising the present invention, the nature of which is set forth in the following general statement, and a preferred embodiment of which is set forth in the following description and illustrated in the accompanying drawings.

The nature of the present invention may be stated in general terms as constituting a harvesting apparatus for ear corn or heads of grain which includes a mechanical carriage or vehicle, an elevator or draper for collecting and conveying harvested seed and related material away from the harvesting device, gathering means located above and extending forwardly from the conveying elevator or draper, stalk severing means located below and rearwardly of the gathering means, a spring-loaded arm for restricting undesired movements of the severed end of the stalk, a pair of parallel harvesting rolls adjacent the rearward end of the gathering means and positioned above the seed collecting means, and drive means for the gathering means and the harvesting rolls.

Referring now to the accompanying drawings in which like designations indicate similar parts throughout the several views:

Fig. 3 is an enlarged fragmentary plan view of the apparatus illustrating a corn harvesting operation;

Fig. 4 is an enlarged plan view of the stalk severing apparatus and associated stalk holding and positioning arm;

Fig. 5 is an enlarged side elevation in partial section of a pair of the harvesting rolls, their support means, and their drive means;

Fig. 6 is an end view illustration of the harvesting roll operation on a corn stalk and ear taken on line 6—6, Fig. 5; and Fig. 7 is a plan view of a modified construction of a dual, double row harvesting roll construction and associated drive and support means.

*Apparatus*

Figure 1:
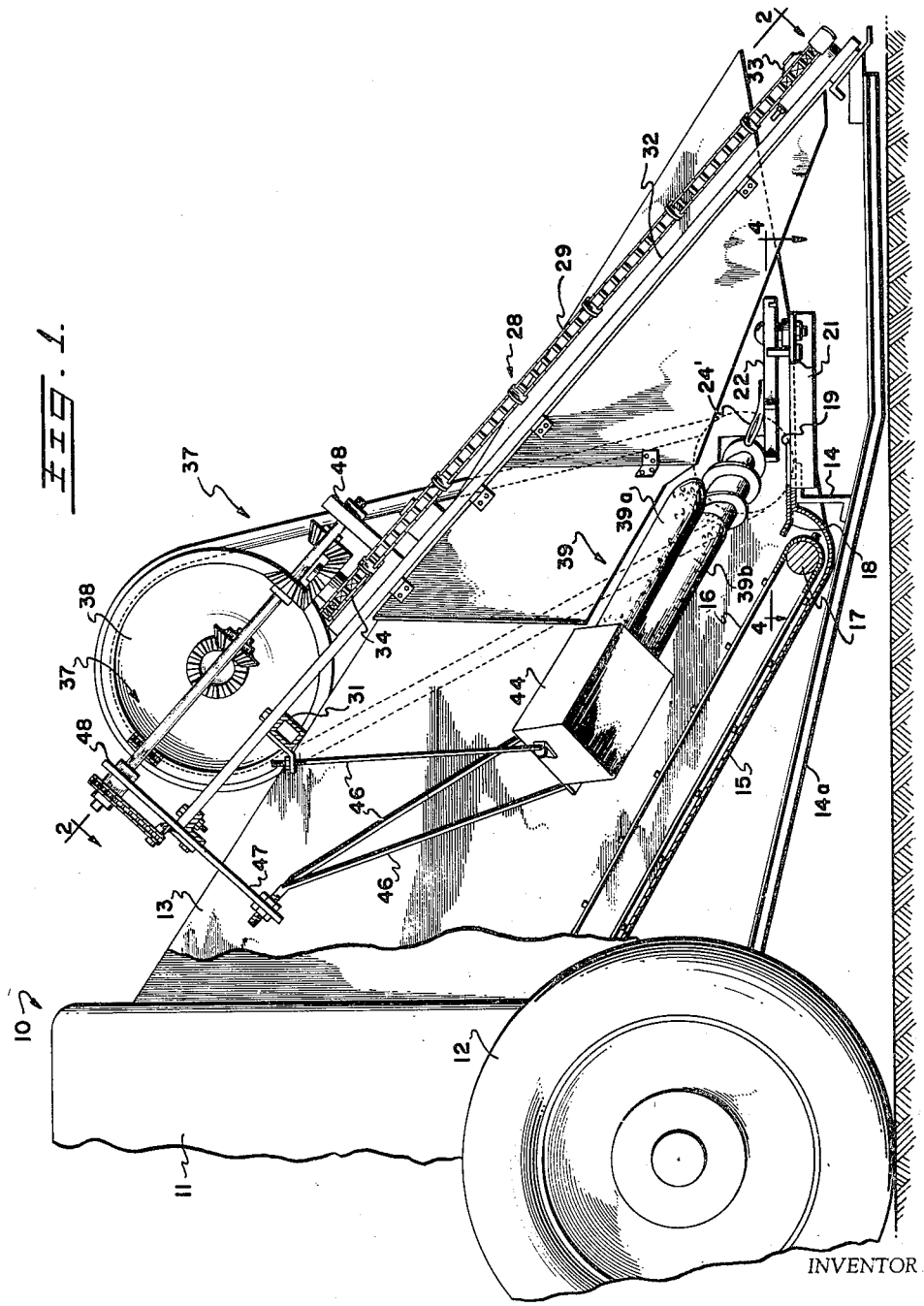
Fig. 1 is a side elevation in partial vertical section of the harvesting apparatus constituting the present invention.

The seed harvesting apparatus constituting the present invention is designed to be attached to or made integrally with a harvesting vehicle of the type generally indicated at 10 which includes a body portion 11 supported for propelled movement on wheels 12.

Associated with the vehicle and extending forwardly and downwardly from the front end thereof are a pair of side panels 13 which form part of the basic frame foundation of the harvesting vehicle constituting the carrier for the present invention and which support throughout their length a downwardly and forwardly extending pan member 15 to the cutting members 19. Intermediate the forward length of the two side panels and the pan 15, a spacer member 14 serves to support the structural member 14a. The spacer member 14 gets its support from the forward end of the pan member 15 which extends upwardly and rearwardly to where it connects to the vehicle body. The pan 15, often referred to as the platform, in conjunction with the side member 13 supports an endless conveyor belt or draper 16 which extends from a mounted position about a front roller 17 immediately rearwardly from the cutting members 19 upwardly and rearwardly into the body portion of the harvesting vehicle 10.

The structural member 14a supports the forward ends of base members 32 of each half of a gathering unit for a single row. A deflector shield 18 extends immediately rearward of toothed members 20, commonly called guards which are secured in a fixed position to the forward edge of platform 15. The deflector shield 18 also extends transversely between the side panels 13, to serve as a deflector shield across the entire width of the draper 16 and the cutting knife 19 which is positioned to work in conjunction with the toothed members or guards 20 in transversely reciprocal arrangement for cooperative severing operation with the fixed guard member in severing stalks of crop moving into cutting position between the fixed guard member. The reciprocating knife 19 is operatively driven from a suitable means at one side of the apparatus adjacent to one of the side panels 13.

In addition to the foregoing severing mechanism the pan member 15 supports a pair of tapered guide members 21 which extend forwardly from beneath the toothed member 20 in an outwardly diverging pattern to provide an inwardly or rearwardly inclined entry into one of the toothed openings of the toothed member 20.

Associated with the pair of guide members 21 is a pronged arm 22, Figs. 3 and 4, which includes a straight section pivotally secured as at 23 to the forward end of one of the guide members 21 to extend rearwardly from said pivot in a direction angularly transverse of the entry defined between said guide members to overlie the rear portion of the second guide member of the pair, the overlying portion of the arm 22 ending in a short Y section branch 24 therein intermediate the length thereof, with one arm of the Y configuration being elongated and terminating in a right angular portion 25 overlying the toothed bar 20 and the knife 19. An upwardly raised finger 24' having a looped end is secured to the arm 22 adjacent the Y branch to restrict the vertical movement of the severed ends of the stalks. A coil spring 26 is secured to the straight portion of the pronged arm 22 forwardly of its pivot point 23 with a second end of the spring being secured to a suitable bracket 27 carried on the guide member to which the arm is pivoted at a point rearwardly from the pivot point thereon. Thus, the arm 22 is normally urged to a position transverse of the entry defined between the guide members 21, with a stop member 28a on the pivot supporting guide member of the pair limiting the movement of the arm 22 under the bias of the spring 26.

A pair of guide members and their associated pronged arm and looped finger as described above are provided immediately beneath and in longitudinal alignment with each gathering unit carried by the harvesting apparatus and function cooperatively therewith in a manner to be hereinafter described.

Figure 2:
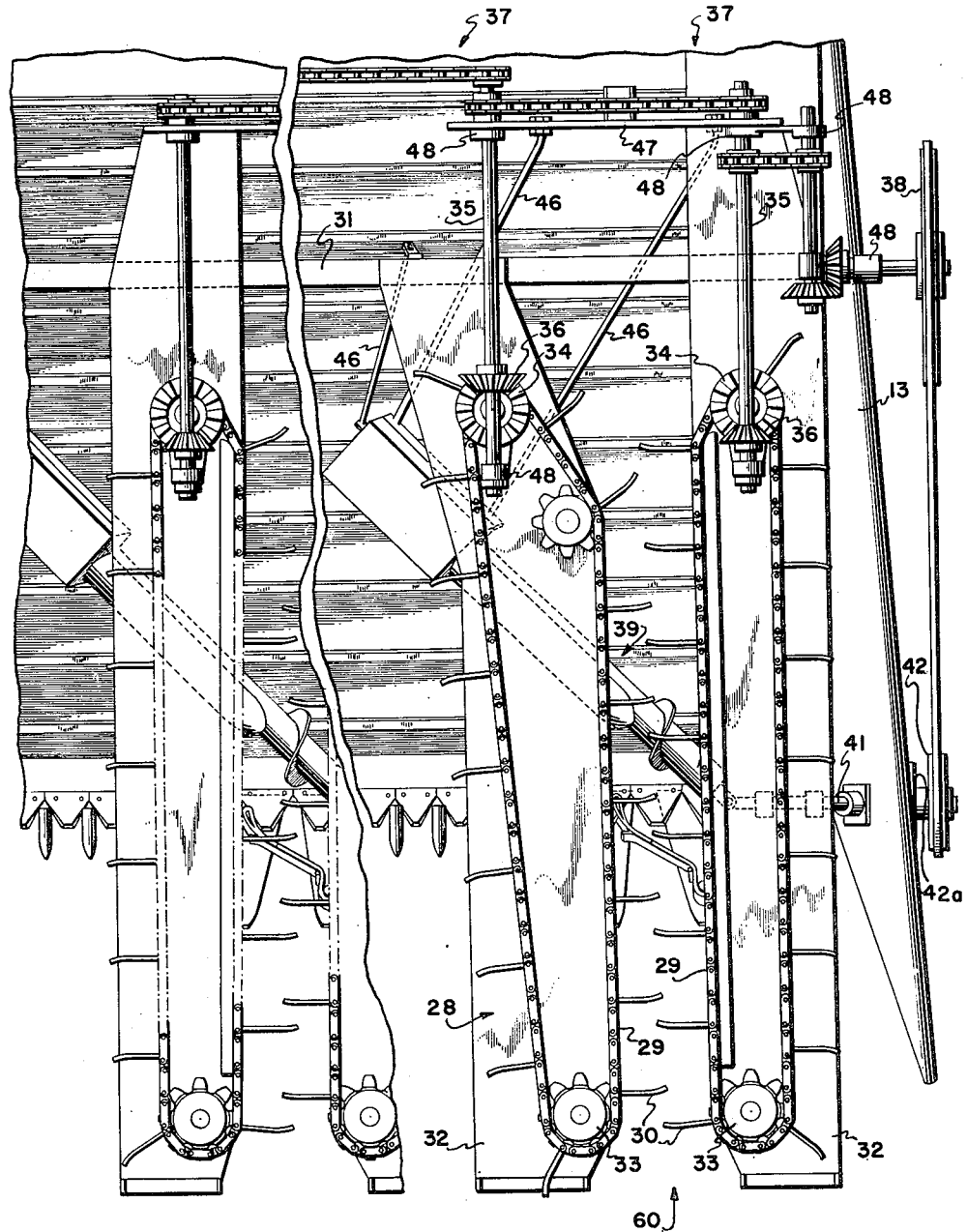
Fig. 2 is a top plan view taken as indicated by line 2—2 of Fig. 1.

Positioned above the gathering conveyor or draper 16 and extending forwardly and downwardly from this elevated position is a gathering unit generally designated at 28, Fig. 2, which includes a pair of cooperatively associated endless sprocket chains 29 each of which carries in spaced relationship therealong a plurality of gathering lugs or tines 30.

The gathering unit is supported at its upward and rearward end by a channel bar 31 which extends transversely between the side panels 13 of the body portion 11 and has its ends secured to and supported by the upper edge portions of the side panels 13. The gathering unit further includes a pair of base frame members 32 one of which underlies each of the chains 29, the upper rearward ends of each of the platforms being secured to the cross channel bar 31 while the lower forward ends of each of the platform members are secured to the forward extended end of the pan 14a. These platform members form the base to which sprocket wheels 33 are rotatably secured at the lower forward end thereof and around which the chains 29 pass, and they likewise form the supporting base to which drive sprockets 34 are secured at the upper rearward end portions thereof and around which the chains 29 also pass. They likewise form the base for well rounded covering shields (not shown in the drawings) which cover the moving parts of the gathering members and provide a sliding surface for raising down stalks.

The drive sprockets 34 are each operatively associated with a drive shaft 35 and a drive bevel gear 36 carried by the drive shaft, and the drive shaft 35 of each of the sprocket wheels 34 is operatively driven through a series of sprockets and chains generally designated at 37 from a common drive wheel 38 mounted outside of and on one of the side panels 13 and which is driven in turn from the drive wheel 42.

The gathering unit 28 as described above provides a longitudinal channel or passage 60 defined between the frame members 32 of the unit opening outwardly at the forward end between the frame members and extending rearwardly and upwardly therebetween with the lugs or tines 30 of the chains 29 moving in overlapping and timed condition so that tines on opposite chains are staggered and move rearwardly and upwardly in the passage defined therebetween continuously with the forward movement of the harvesting vehicle.

Associated with each of the gathering units 28 is a pair of harvesting or snapping rolls 39 which are angularly positioned to intersect the passage formed between the platforms and chains of the gathering unit 28.

The harvesting rolls in each pair are mounted in parallel relationship and are spaced in such a manner as to permit the stalk B of a crop to enter between the rolls in frictional engagement therebetween. The rolls 39 are mounted at an angle with respect to the front and rear passage formed in the gathering unit to provide an upper and a lower roll 39a and 39b respectively with the upper roll terminating at a point where it begins to intersect the passage, and the lower roll 39b extending entirely across the passage where its extremity is connected by a universal joint 40, Fig. 3, beneath the far frame member 32, to a drive shaft 41 which in turn is driven by a drive wheel 42a, Fig. 2, mounted outside of the side apron 13, the drive shaft 41 being driven from the main power source through the main body of the machine 11.

The extended portion of the lower harvesting roll 39b where it crosses through the passage formed between the platforms 32 of the gathering unit 28 is provided with a raised spiral section 43 which spiral section terminates adjacent the end of the upper and shorter roll 39a.

The upper ends of the two harvesting rolls are journalled in a box 44, Fig. 5, and each is provided with meshing gears 45 within the box which gears transmit rotation from the longer roll 39b driven from drive wheel 42 to the shorter roll 39a in such a manner as to cause the rolls to rotate in opposite directions with respect to each other.

The journal box 44 of the harvesting rolls 39 is adjustably supported by means of a plurality of tie rods 46, Figs. 1 and 2, which are anchored to the cross bar 31 and to a second cross plate 47 which supports the general drive arrangement 37 and provides for vertical and horizontal adjustment of the box 44 and the rolls 39a and 39b.

Required bearings for journalling the drive shafts for the sprocket wheels 34, the general drive arrangement 37 and the drive shaft 41 for the harvesting rolls are herein generally designated at 48 at those required points.

With the foregoing description in mind and with particular reference to Figs. 1 and 2 it may be readily seen that provision has been made for gathering by means of chain supported lugs or tines crop stalk at ground level and for moving the stalk rearwardly through a defined passage in a gathering unit into contact at its base with a pronged arm 22 associated with a severing arrangement and adjacent an intermediate upper portion with a harvesting roll construction which harvesting roll construction is positioned gneerally above a gathering conveyor 16.

With particular reference to Fig. 7 there is shown a modified arrangement for the construction of two pairs of harvesting rolls generally designated therein as 49 wherein one roll of the two pairs is driven through a universal joint 50 at its extended end and the driven rotation thereof will drive the remaining three rolls of the two pairs through the medium of operatively interconnected gearing 51 in a journal box 52 common to the upper end of both pairs of rolls which are angularly disposed. By this construction the harvesting rolls required for two adjacent rows of crop can be economically and efficiently provided with the use of a single driving system and a single journal mounting.

*Operation*

In operation of a single harvesting unit of the type described, operation of plural units for multiple rows being identical to a single operation, the vehicle is moved forwardly along a row of standing crop and the lugs or tines 30 of the gathering unit engage the stalk of the crop adjacent the ground and guide it rearwardly through the passage defined between the frame members 32 and chain units 29 of the gathering unit.

When the stalk of the crop has moved rearwardly in the gathering unit to a certain point the base portion of the stalk will engage the straight portion of the pronged arm 22 and will force the arm against the bias of the spring 26 to move arcuately rearwardly thereby permitting the stalk to jump past the short arm of the Y configuration 24 to a position as is generally indicated in Fig. 3 whereupon the elongated arm portion of the Y configuration under the bias of the spring 26 will urge the stalk against the opposite side of the passage as soon as same is engaged by the cutting units. At the same time the pronged arm construction 22 will be continuously engaging the stalk at its base cooperating with the lugs or tines 30 in the gathering unit in maintaining the stalk in an upright position.

Substantially simultaneously with the severing of the base of the stalk, a slightly higher part of the stalk will engage the spiral portion of the lowermost harvesting roll 39b which spiral portion will convey the stalk portion between the two rolls and the reverse rotation of the rolls will force the stalk downward and will simultaneously move it angularly away from the line of the incoming row into the gathering unit. As the harvesting rolls frictionally lower the corn stalk B between them the ears of corn thereon will be squeezed from the stalk to fall onto the gathering conveyor and the stalk will then be discharged forwardly in the direction of travel of the unit and to the side and out of the path of the incoming row of crop.

Again referring to Fig. 7, it is evident that when a dual harvesting roll construction is utilized for adjacent, parallel rows of crop a stalk from the two rows will be discharged at closely adjacent points to fall forwardly in the direction of travel of the unit between the lines of the two rows of crop being harvested.

From the foregoing it can be seen that a novel and improved grain harvesting apparatus has been provided in which there is a minimum of movement of the stalk of the harvested crop subsequent to its cutting and prior to its entrance into the harvesting rolls, and that the improved and useful apparatus constituting the present invention attains and inherently possesses all those objects and advantages heretofore set forth.

In the foregoing description certain terms have been used for brevity and clearness of understanding and certain embodiments of the improved construction have been illustrated and described by way of example, but the scope of the present invention is not to be limited by the implications of the language used or by the exact details of construction shown.

Having now described the invention, the constructions and operations of the preferred embodiments thereof, and the advantageous new and useful results obtained thereby, I hereby claim:

1. Seed harvesting apparatus in combination with a carriage movable lengthwise of a row of standing crop including stalk gathering means projecting forwardly from the carriage in the direction of carriage travel, stalk severing means associated with said gathering means and adapted to sever the stalk of the crop adjacent the ground, a pair of seed stripping rolls, said seed stripping rolls having their longitudinal axis extending generally upwardly and at an angle relative to said gathering means and the direction of carriage travel with the lower ends of said rolls positioned to receive the severed end of the stalk from the stalk severing means, power means for operating the gathering means, said severing means and for rotating the seed stripping rolls in opposite directions with the opposed surfaces of the rolls moving in a generally downwardly direction whereby the severed stalk will be discharged forwardly and to the side of the path of the incoming row of crop.

2. Seed harvesting apparatus in combination with a carriage movable lengthwise of a row of standing crop, a pair of opposed spaced endless stalk gathering means projecting forwardly from the carriage in the direction of carriage travel, stalk severing means carried along the leading edge of the carriage and adapted to sever the stalk of the crop adjacent the ground, a pair of seed stripping rolls, said stripping rolls having their longitudinal axis in spaced, parallel, superposed relation with the longitudinal axis extending generally upwardly and at an angle relative to said stalk gathering means and the direction of travel of the carriage, one of the rolls extending downwardly and forwardly of the other of the rolls with the lower end of said one roll positioned to receive the severed end of the stalk from the stalk severing means, a raised spiral provided on the lower end of said one roll to engage and convey the severed stalk angularly between said pair of rolls, means for operating the gathering means, the severing means and for rotating the seed stripping rolls in opposite directions with the opposed surfaces of the rolls moving in a generally downwardly direction whereby the severed stalks will be discharged forwardly and to the side of the path of the incoming row of crop.

3. A harvesting apparatus construction as defined in claim 2 wherein said gathering unit includes a pair of spaced parallel endless chains defining a front and rear passage therebetween, a plurality of stalk engaging pick-up tines on each of said chains, and said tines projecting into said front and rear passage in overlapping opposition to move crop stalks rearwardly of said unit in said passage.

4. A harvesting apparatus construction as defined in claim 2 wherein said stalk severing means includes a fixed toothed bar extending transversely of the front end of said carriage rearwardly from the leading end and beneath the gathering unit, a plurality of reciprocating knives associated with said toothed bar, a pronged arm spring seated to be normally urged laterally of said toothed bar, said arm being deflected by a rearwardly moving stalk in said gathering unit to admit said stalk to a toothed portion of said bar, and the spring bias of said arm causing said arm to hold and move said stalk into knife severing relationship within said toothed portion of said bar.

5. A harvesting apparatus construction as defined in claim 2 wherein the forward end of said carriage is provided with a forwardly and downwardly projecting pan member, a gathering conveyor movable from beneath said stripping rolls to a remote point within the carriage being mounted on said pan, said severing means being mounted on said pan intermediate its forward length, and the forward extended end of said pan forming a support for the forward extended end of said gathering unit.

6. Seed harvesting apparatus in combination with a carriage movable lengthwise of a row of standing crop including a stalk gathering unit comprising a pair of spaced substantially parallel frame members mounted in an elevated position on the forward end of said carriage to extend downwardly and forwardly therefrom, a pair of sprocket mounted endless chains carried one by each of said platforms longitudinally thereof to define a front and rear passage therebetween, a plurality of stalk engaging pick-up tines spaced along the length of each of said chains, said tines projecting into said passage in overlapping and staggered opposition to engage and move crop stalks rearwardly of said unit in said passage, a stalk severing means mounted on the forward end of said carriage rearwardly of the forward end of and beneath said gathering unit, said severing means comprising a fixed toothed bar extending transversely of said carriage, and reciprocating knives associated therewith, a pronged spring seated arm normally urged laterally of said toothed bar, said arm being deflectable by a rearwardly moving stalk in said gathering unit to admit said stalk to a toothed portion of said bar to be severed therein by said cooperative knives, stalk stripping rolls mounted in association with said gathering unit and comprising a pair of parallel closely spaced rolls journalled and geared for rotation in opposite directions, said rolls being mounted to extend at an angle relative to the front and rear passage defined by the chains of said gathering unit, one of said rolls extending to intersect said passage and being provided with a raised spiral to engage and convey said stalk angularly between said rolls, drive mechanisms for said gathering unit chains, said severing means and said rolls, and said drive mechanisms being operatively driven from a common source on said carriage.

References Cited in the file of this patent

UNITED STATES PATENTS

| | | |
|---|---|---|
| 348,730 | Ferguson | Sept. 7, 1886 |
| 1,695,902 | Sandefur | Dec. 18, 1928 |
| 1,945,364 | Coultas | Jan. 30, 1934 |
| 2,333,901 | Swenson | Nov. 9, 1943 |
| 2,371,822 | Hyman | Mar. 20, 1945 |
| 2,379,822 | Mitchell et al. | July 3, 1945 |